United States Patent [19]

Mantele

[11] 4,236,844
[45] Dec. 2, 1980

[54] JOINT SUPPORT STRUCTURE

[75] Inventor: Erwin Mantele, Tuttlingen, Fed. Rep. of Germany

[73] Assignee: Gebr. Berchtold, Fed. Rep. of Germany

[21] Appl. No.: 897,384

[22] Filed: Apr. 18, 1978

[30] Foreign Application Priority Data

Apr. 21, 1977 [DE] Fed. Rep. of Germany ....... 2717828

[51] Int. Cl.³ .............................................. F16C 11/06
[52] U.S. Cl. ...................................... 403/55; 248/276
[58] Field of Search ....................... 403/90, 56, 54, 84, 403/83, 55; 248/276

[56] References Cited

U.S. PATENT DOCUMENTS

| 3,211,405 | 10/1965 | Fey et al. ............................ 403/90 X |
| 3,240,516 | 3/1966 | Barish et al. ....................... 248/284 X |
| 3,910,538 | 10/1975 | Baitella ............................... 403/90 X |

FOREIGN PATENT DOCUMENTS 207363 3/1909 Fed. Rep. of Germany ........... 248/484
635871 9/1936 Fed. Rep. of Germany ........... 248/181
688685 3/1953 United Kingdom ...................... 403/56

*Primary Examiner*—Andrew V. Kundrat
*Attorney, Agent, or Firm*—Jerome P. Bloom

[57] ABSTRACT

A joint support structure comprising means forming a housing defining a chamber embodies an axially movable wall portion constituting a clamping device which forms one wall portion of the chamber. This chamber contains radially movable means and means responsive to movement of the axially movable wall portion to induce or accommodate a radial shift of said radially movable means. Means projecting outwardly of the housing includes a rod axially movable in response to movements of said radially movable means to clamp a related joint element to or release the related joint element from a defined seat.

Various arrangements are provided to constitute the means responsive to movement of the axially movable wall portion, each of which dictates that essentially the total of the applied forces are translated into a direct radial movement of the rod or rods associated with the joint support structure.

15 Claims, 9 Drawing Figures

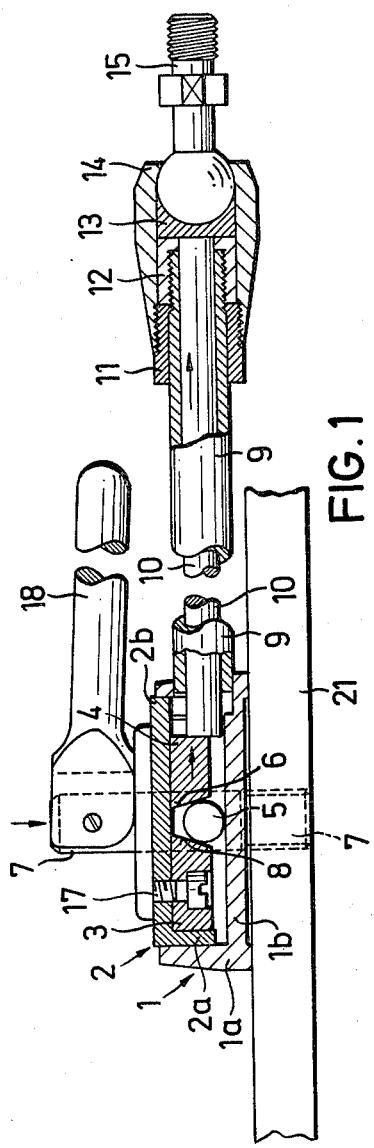
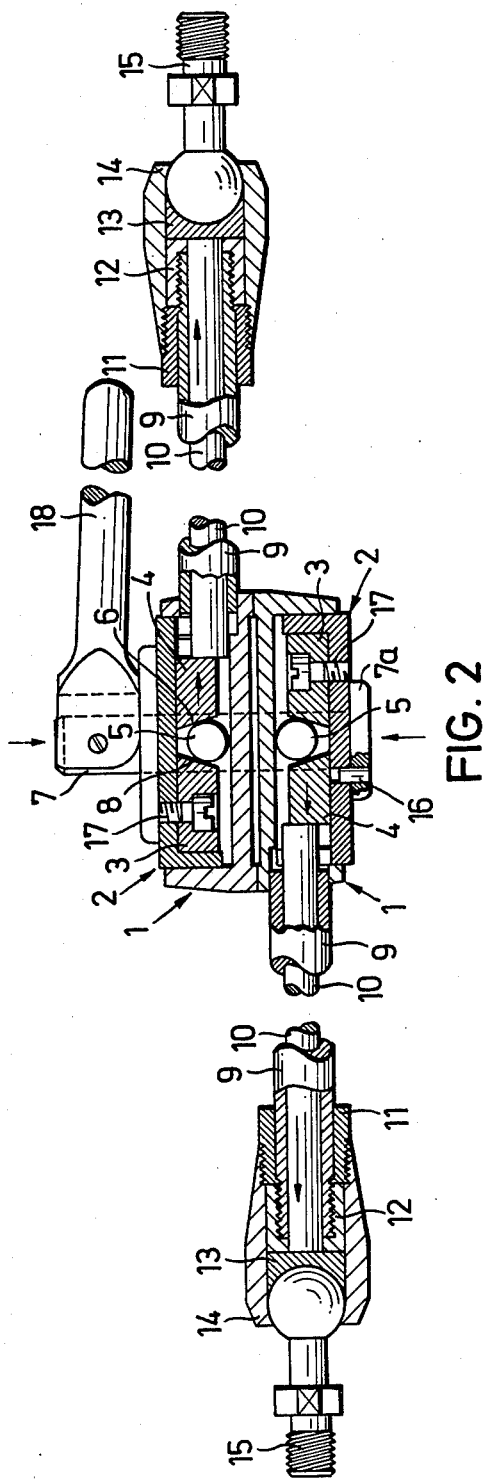

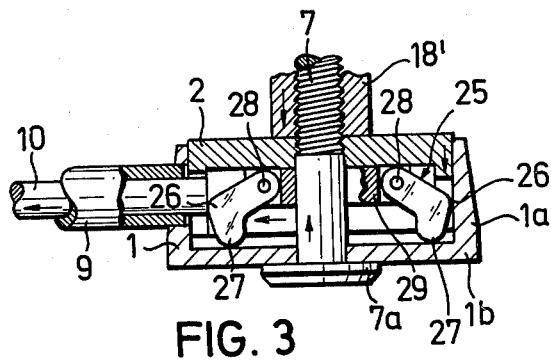
FIG. 3
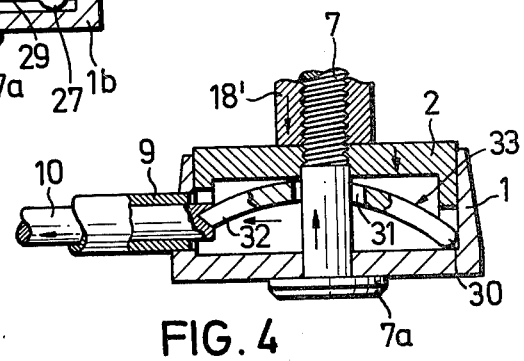
FIG. 4
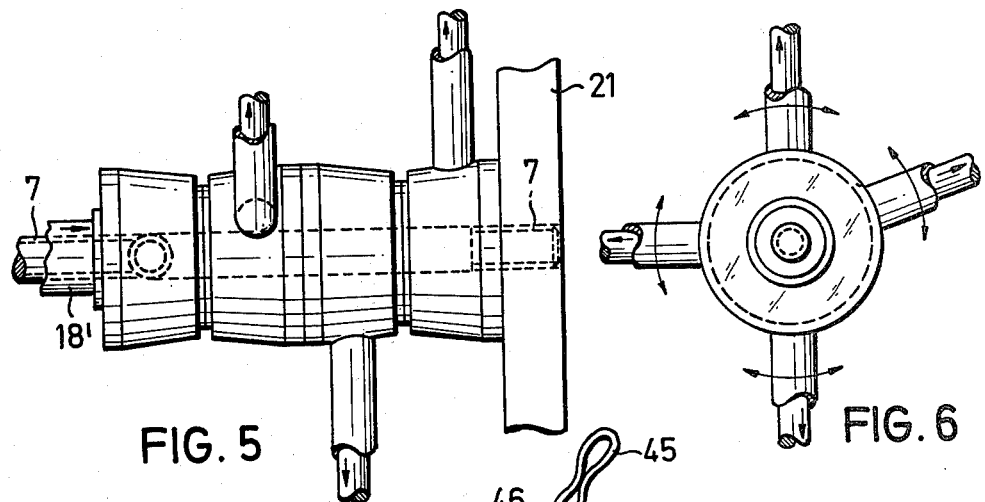
FIG. 5
FIG. 6
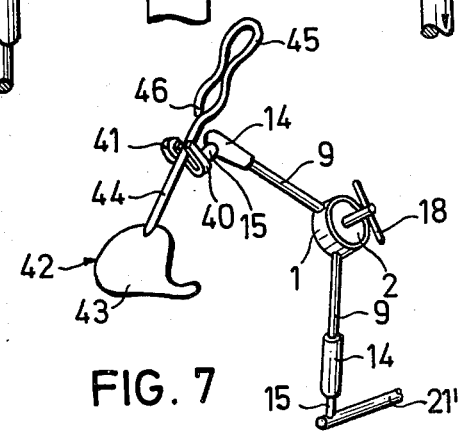
FIG. 7

JOINT SUPPORT STRUCTURE

The present invention relates to a joint support structure.

The most pertinent prior art is disclosed in U.S. Pat. No. 3,240,516 and German Publication DT-OS-2419637.

The U.S. Pat. No. 3,240,516 reveals a joint support wherein two bearing housings arranged against each other are penetrated by a single tension bolt. The bearing housings are so mounted as to be rotatable against each other and relative to the axis of the bolt. Each bearing housing has an attached sleeve in which a rod slides perpendicular to the axis of the tension bolt. The rod interacts with a ball joint located at the end thereof remote from the bearing housing in such a way that this joint becomes fixed in a predicted position after exerting an axial pressure upon the joint seat. A wedge surface is located at the end of the rod most adjacent the bearing housing. The wedge formed surface of a clamping element engages a wedge formed surface of the bearing housing and the wedge surface of the rod. This clamping element is arranged around the tension bolt and has a clamping plate in connection therewith which is exterior to the bearing housing. In the assembly of the parts the tension bolt has one end screwed into the clamping plate connected with one clamping element while its other end is connected to a clamping device associated with the clamping plate of the other clamping element. With the operation of the clamping device it is possible to move the clamping plates towards each other and along the associated wedge surfaces. The result is an outward movement of the rods and a consequent locking of the associated ball joints. However this cannot be achieved without considerable friction, wear of the parts and possible binding absent considerable lubrication.

The German disclosure DT-OS-2419637 has a similarly designed joint support wherein conical surfaces are located on the tension bolt. These surfaces are arranged to interact with the edges of ring elements which are arranged eccentrically in reference to the tension bolt. A rod is attached to each of the ring elements for axial displacement and the locking of a ball joint.

The tension bolts of these known joint supports are required to be of very large dimension since they are subjected to shear forces in addition to axial tension and pressure. Moreoever, sterilization of these known joint supports is difficult since the joints must have lubrication. Such problems are of particular consequence when the joint structure is employed in apparatus utilized in surgical procedures.

It is to the solution of such problems that the present invention is directed.

SUMMARY OF THE INVENTION

The embodiments of the present invention are particularly designed for application in apparatus which is used in a surgical or like environment wherein sterility is a requirement.

A joint support structure in accordance with the present invention comprises means forming at least one housing defining a chamber embodying one axially movable wall portion constituting a clamping device. The chamber is arranged to include radially movable means and means responsive to movement of the axially movable wall portion to induce or accommodate a radial shift of the radially movable means. Means projecting outwardly of the housing include a rod axially movable in response to radially outward movement of said radially movable means to clamp a related joint element to or release the related joint element from a defined seat.

The preferred embodiments of the invention are distinguished by the means responsive to movement of the axially movable wall portion of the housing being in the nature of roller elements which are operatively related to the radially movable means to produce a smooth, free and relatively direct radial movement thereof to achieve the axial movement of the related rod means.

Invention embodiments are distinguished by a most efficient arrangement of movable elements which reduces friction to an absolute minimum and enables the axial movement of the rod which clamps a related joint element to its seat in a manner that any pressure applied to the rod is in a sense axially thereof. The arrangement avoids the canting of parts and resulting undesirable friction which would in such case make lubrication absolutely necessary. Nor do we find in the embodiments of the present invention a concentration of applied force but rather a distribution of applied force and primarily in a single direction. Particularly significant is the embodiment of the invention herein illustrated wherein there is a backing for paired rollers which are diametrically spaced and so backed that an axial movement of the clamping plate will distribute pressures to induce a direct radial movement of the radially movable element and thereby direct radial movement of the rod to which the same is applied.

It is therefore a primary object of the invention to provide a joint support structure particularly beneficial for use in apparatus the environment of which requires substantial sterility in its parts.

Another object of the invention is to provide apparatus of the type described possessing the inherent meritorious characteristics and the means and mode of use herein set forth.

In the accompanying drawings,

FIG. 1 shows a generally diagrammatic side view of joint support structure constituting a first embodiment of the invention shown partially in section;

FIG. 2 illustrates a similar side view showing the joint support structure of FIG. 1 in a twin arrangement thereof;

FIG. 3 illustrates, diagrammatically, a longitudinal sectional view of a further embodiment of the joint support structure as contemplated by the invention;

Figure 9:
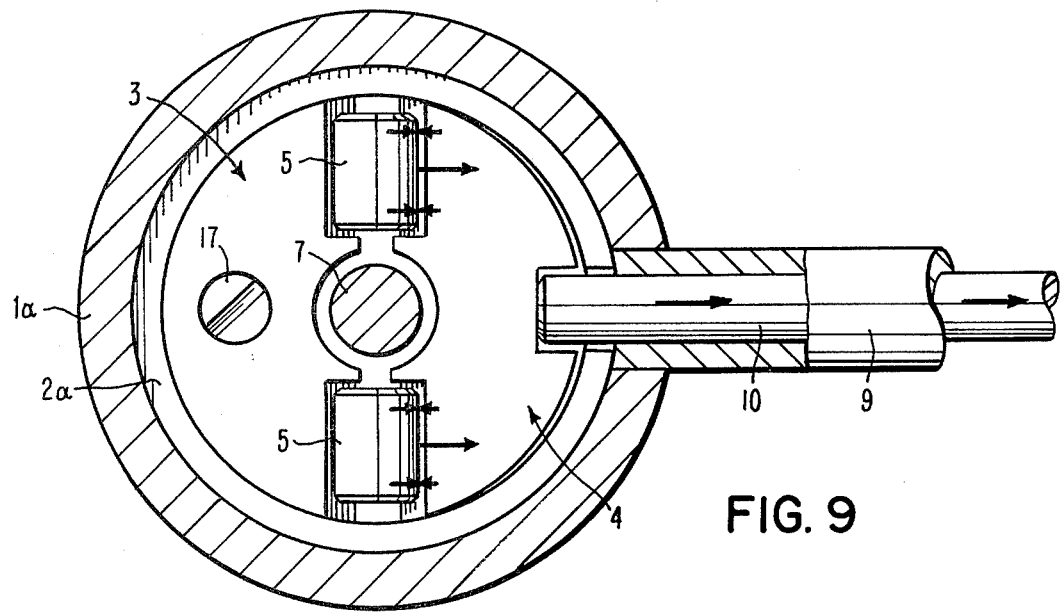
Figure 8:
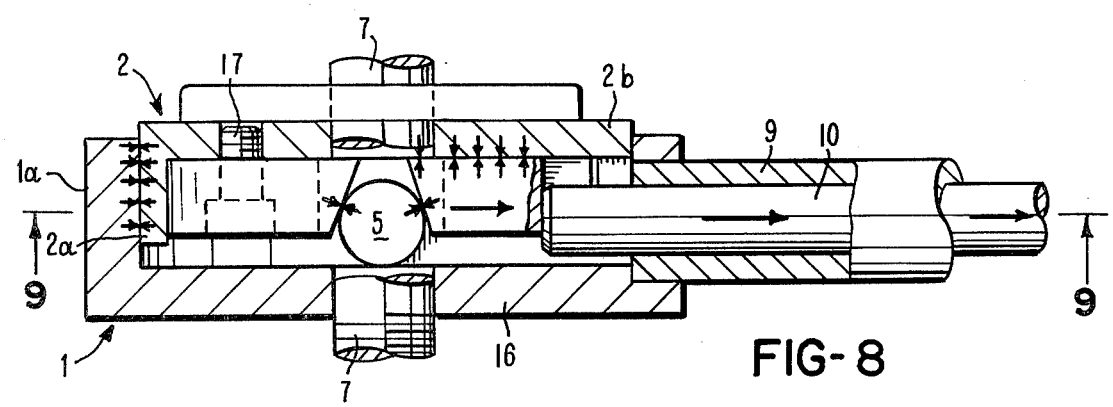

FIG. 4 diagrammatically illustrates a sectional side view of another design for a joint support;

FIG. 5 illustrates a side view of the joint support of the invention in a multiple arrangement thereof;

FIG. 6 illustrates an end view of the multiple arrangement of FIG. 5;

FIG. 7 illustrates the mounting of a gripping device to the ball joint section of a joint support per the included illustrations;

FIG. 8 is an enlarged cross sectional view of the joint support structure of FIG. 1; and FIG. 9 is a view taken on line 9—9 of FIG. 8.

It is to be understood clearly that applicant has disclosed only so much structure as may be necessary for the understanding of the present invention. Additional structure which may be used in connection therewith may be of various nature and scope the character of which is well known to those versed in the art with which we are here concerned.

The joint support structure of FIG. 1 includes a cup-shaped bearing housing 1 having a housing wall 1a formed integral with and projecting peripherally and perpendicularly of its base 1b. As shown, the opening at the top of the housing 1 is bridged by a telescopically nested clamping plate 2 which is also cup-shaped in character, including a cylindrically formed base 2b positioning uppermost having an integrally connected relatively depending perpendicularly projected ring-like wall structure 2a projected inwardly of the wall 1a. In the case illustrated the housing 1 is shown to be based upon a plate 21 which includes an aperture aligned with central apertures in the base 1b of the bearing housing and the base plate portion 2b of the clamping plate 2. The aperture in the plate 21 is tapped to provide it with an internal thread in which is screwed one end of a tension bolt 7 which projects upwardly from the plate 21 and through the central apertures in the base 1b and the clamping plate base 2b. Above the clamping plate portion 2b and outwardly therefrom a lever 18 has one end thereof pivotally connected to the upper projected extremity of the tension bolt 7. The end of the lever 18 which is pivotally connected to the bolt has a cam surface which provides that on movement of the lever 18 to a horizontal position as shown in FIG. 1 the cam surface will bear against an outer projected surface of the clamping plate and move the clamping plate inwardly of the bearing housing 1 in a manner and for purposes to be further described.

The wall portion 1a of the bearing housing 1 has an opening in one side in which is fixed the inner end of a tubular element forming a sleeve 9. The sleeve 9 projects outwardly from and in a sense radial to the housing 1. Mounted for axial sliding movement in the sleeve 9 is a rod 10 which is longer than the sleeve and has a cupped socket seat 13 fixed to its outer extremity, which projects outwardly of and beyond the sleeve. As illustrated in FIG. 1, a socket housing 14 is coupled to the sleeve 9 to extend about the outer end of the rod and the socket seat 13, beyond which the inner wall surface of this bushing is cupped to seat a ball element integral with one end of a support rod 15 which projects from and beyond the bushing 14. As may be seen the socket seat 13 directly faces and has a configuration complementary to the spherical configuration of the facing ball portion of the part 15 and it is adapted to limit the movement of this ball portion with reference to its seat. A ring including an externally threaded outer surface portion is positioned about the sleeve 9 to threadedly engage in and with the tapped inner end portion of the inner surface of the bushing 14 and to abut a counter holder 12. The holder 12 has a cup shape the centrally apertured base of which is applied about the rod 10 to threadedly engage about the outer end of the sleeve 9 and abut the ring element 11. The arrangement is such to afford a predetermined containment of the outermost end of the rod 10 which embodies the socket seat 13. This containment, dimensionally, is such that upon an axial movement of the rod 10 very slightly in a sense inwardly towards the bearing housing 1 the ball portion of the part 15 may be freely adjusted with reference to its seat. By the same token, a slight axial outward movement of the rod 10 provides a firm lock of the ball portion to its seat.

Located within the clamping plate 2 in a generally co-planar relation are two generally hemi-cylindrical segments 3 and 4 which have complementary configurations on their diametral sides which are in a relatively adjacent facing relation. In their composite, the diameter of a circle which would be defined by the segments 3 and 4 is somewhat less than that of the uppermost or base plate portion 2b of the clamping plate 2 within the limits of the dependent portion 2a. The one segment 3 is fastened by a screw 17 to the inner surface of the plate portion 2b which faces the base 1b of the housing 1. The segment 3 is fixed so the central portion of its arcuate surface is in abutting relation to and backed by the arcuate inner wall surface of the clamping plate portion 2a to one side of the bearing housing. The other segment 4 is positioned diametrically opposite the segment 3, free of both the segment 3 and the clamping plate 2. The adjacent facing diametral sides of the segments 3 and 4 are centrally notched to accommodate the passage therebetween and thereby of the tension bolt 7. At each of their opposite diametral extremities and to either side of the central notches each of the facing surfaces of the segments 3 and 4 have generally rectangular notches. The facing surfaces provided in the facing wall portions of these notches which are formed in the diametrally opposite edge faces of the segments 3 and 4 are sloped and they are so sloped to provide surfaces 8 and 6 which converge in a sense upwardly with reference to the underlying base 1b of the housing 1 and to their point of contact with the inner surface of the clamping plate portion 2b. Accommodated in each pair of notches at each of the diametrally opposite ends of the facing sides of the segments 3 and 4 is a cylindrically configured roller element 5 a longitudinally extended portion of the circumference of which is based on the housing base 1b and longitudinally extending surface portions of which likewise bear on directly opposed portions of the sloping surfaces 8 and 6. As will be seen from FIG. 8, the roller elements 5 function to normally maintain the segment 4 elevated with reference to the base 1b and in directly facing horizontal alignment with the segment 3.

Not only does the ring-shaped wall portion 2a in connection with the clamping plate portion 2b have a notch accommodating the projection therethrough of the inner end of the rod 10 but the segment 4 has an aligned rectangular notch which accommodates the inner extremity of the rod 10. The arrangement is such that the roller elements 5 are diametrally aligned with reference to the segments 3 and 4 to space the same and essentially define a diametral line thereof. The notch in the center of the arcuate side of the segment 4 positions the inner extremity of the rod 10 so that it orients not only pperpendicular to the longitudinal axis of the roller elements 5 but to the vertical axis defined by the tension bolt 7.

As mentioned previously, the cocking lever 18 has by reason of its eccentric cam surface on its pivoted end an ability, having reference to the arrangement shown in FIG. 1, that when moved from a vertical to a horizontal position it will press inwardly on the clamping plate 2 to force its plate portion 2b and the segments 3 and 4 axially inward of the housing 1 towards the base 1b, exerting a uniformly distributed pressure which drives the sloping facing surface portions 8 and 6 of the segments 3 and 4 downwardly over the rollers 5 which position therebetween. As the rollers 5 move upwardly between the upwardly convergent surfaces 6 and 8 there is a resultant natural and direct radial movement of the segment 4, permitted by the space provided between the segment 4 and the adjacent inner surface portion of the part 2a, sufficient to pressure the rod 10 the inner extremity of which it abuts in a sense directly and radially outward to press the socket seat 13 on its outer projected extremity to firmly abut and thereby cause the ball of the rod 15 to be fixed in an aligned position to the seat provided therefor by the socket bushing 14.

Particular attention is directed to FIGS. 8 and 9 of the drawings which clearly illustrate the balance of forces exerted in the movement of the clamping plate to effect a radial outward movement of the rod 10. The arrangement is such that shearing forces are substantially eliminated and the forces involved are fully translated into axially directed forces the net result of which is that through the medium of the roller elements and the movability of the one segment 4 relative the other segment 3 and by reason of the fact that there is a relatively flat control surface on the segment 4 in contact with a similar surface at the inner extremity of the rod 10 there is no canting of the rod possible and therefore the components will mutually interact without the need for lubrication. Friction of any undesirable nature such as exists in the prior art devices first described is virtually eliminated.

Instead of utilizing a plate 21 as shown in the embodiment of FIG. 1 a second bearing housing 1 with a joint support arrangement such as described with reference to FIG. 1 could be coupled to the first so that the bearing housings 1 abut each other at their base. In such case a single tension bolt 7 can be used to project through both the bearing housings. At the end thereof remote from the eccentrically connected cocking lever 18 and outwardly of the clamping plate portion 2b embodied in the second bearing housing the bolt will have a cap plate 7a. The latter provides a clamping head rotation of which with respect to the housing is prevented by the application of a pin 16 through the head and into the clamping plate which it abuts. With this arrangement, as the cocking lever is operated and its eccentric cam surfaces bears inwardly on the adjacent clamping plate both clamping plates will be pressued inwardly of their respective housings to simultaneously move each related rod 10 in a direct axial path, whereby the related ball joints will be simultaneously fixed in their required aligned positions. It is of course possible to use other means than a cocking lever such as shown to achieve the desired result. For example, one may employ for such purposes a device screwed on to the bolt 7 or some other device having similar mechanical capabilities.

FIG. 3 shows a design of a further clamping element arrangement utilizing a bearing housing 1 and a clamping plate 2 of the nature first described. In this case, instead of the segments 3 and 4, a support 29 which has a ring-shaped configuration is applied within the clamping plate 2 in surrounding relation to the tension bolt 7. The arrangement is such that this ring part does not come into contact with the bolt in any position of its operation. Diametrically opposite L-shaped levers 25 are supported at diametrically opposite positions in connection with the support 29 with their one ends pivoted at 28 to the support 29 while their remote ends 27 rest upon the base 1b of the bearing housing 1, also at diametrically opposite positions. The intermediate corner portion 26 of one L-shaped lever 25 is arranged to bear against the housing wall 1a at one side thereof while the same corner 26 of the other lever 25 projects toward the side of the housing which is directly opposite and which includes the aperture in which is anchored the inner end of the sleeve 9, through which projects the innermost end of the rod 10. This last corner 26 of the last mentioned lever 25 bears against the innermost end of the rod 10 in a relatively laterally centered relation thereto. In this case the tension bolt 7 is a headed bolt having a cap 7a positioned exterior to and abutting the outer surface of the base 1b of the bearing housing while its other end projects through the base 1b and upwardly of the housing through the central aperture in the clamping plate 2 to be threadedly engaged exterior thereto by a nut 18'. As will be seen, on turning the nut 18' inwardly towards the base 1b a pressure is directly applied to the clamping plate 2 in the direction of the axis of the tension bolt 7, whereupon the corner 26 of the lever 25 at the inner end of the rod 10 pushes the rod axially outward whereby the related ball joint arrangement which is similar to that illustrated in the case of FIGS. 1 and 2 becomes absolutely locked. Again, the pressure and forces applied are directed consistently in a sense axially of the operative components, by reason of which there is no canting of the rod 10 or undesirable friction and shearing forces applied which would necessitate lubrication for operation of the device.

FIG. 4 shows another design wherein the means interiorly of the chamber defined by the bearing housing 1 and the clamping plate 2 consists of an arched spring element 33. The spring element in this case has a large central opening 31 through which the tension bolt 7 passes. This opening is sufficient to permit considerable play between these elements in an axial direction corresponding to the axial direction of the rod 10. One end of the arched spring 33 seats against the base of the cup-shaped housing 1 at the base of its wall structure, and the other end is applied to and in a notch provided in the inner end of the rod 10. The central apertured portion of the arched spring defines its peak and this peak, about its aperture, presses upwardly, in the orientation illustrated, against the inner surface of the bridging plate portion 2b of the clamping plate 2. As will be obvious, in this case on turning the screw 18 down upon the threaded upper extremity of the tension bolt 7 the clamping plate 2 will be pressured to move inwardly of the bearing housing 1, thereby exerting axial pressure on the spring element 33 which is translated into a direct axial pressure on the rod 10 to move the same outwardly of the housing 1 just sufficiently to lock the related joint arrangement in a manner as first described. Here it is the elongation of the spring element 33 in a radial direction which shifts the rod 10 into the locking position as required. Once more it may be seen that moving parts are at a minimum and there is virtually no friction problem existing.

FIGS. 5 and 6 illustrate, in what is believed to be an obvious manner, an end to end arrangement of a plurality of joint support units such as previously described adapted so that they may be served by a common tension bolt 7 and a single clamping means 18'. The entire series of joint supports may be arranged so one may simultaneously move the related rods such as the rod 10 here employed in a direct radial pattern to serve individual locking functions in connection with their related joints.

FIG. 7 is a diagrammatic showing of a specific application of the joint support structures of the invention. Here multiple units are intended. As shown, rod 15 projects from the related ball joint arrangement of each. In the one case the rod 15 is shown to be connected to a further rod 21' which might have one specific function. The other rod 15 illustrated mounts and supports a clamp 40 including a bolt-nut combination by means of which jaws of the clamp 40 may be tightened on a shaft 44 of a retractor 42 to fix the same in place. The shaft 44 mounts to one end thereof a pliable spoon 43. The other end 46 of shaft 44 terminates in an eight shaped segment 45 which forms an extension of the shaft 44. The segment 45 is arranged to be deformable, enabling an adaptation thereof to various requirements. As will be obvious the clamp 40 permits quick adjustment of the shaft 44.

The present invention has been described with reference to showings which are more or less schematic and diagrammatic but it is felt that sufficient structure is revealed to enable anyone versed in the art to clearly comprehend the substance and benefits thereof.

It must be emphasized that the advantages of the invention are most clearly comprehended when applied to apparatus wherein lubrication is undesirable and unacceptable and where it is required that there be no binding, friction or other problems which would require frequent maintenance or which would interfere with the free movement and precise positioning of the controlled parts.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A joint support structure comprising means forming at least one housing having therein at least one chamber, said housing embodying one wall portion which is axially movable to and from an opposite wall portion of said chamber, means one end portion of which projects in said housing to be exposed to the interior of said chamber and the opposite end portion of which projects outwardly of said housing for application thereof to selectively clamp a related joint element to a defined seat, motion transmitting means in said chamber including at least a portion thereof which is arranged to turn about a pivot axis, in response to movement of said movable wall portion towards said opposite wall portion of said chamber, to move in a direction laterally of the direction of movement of said movable wall portion and produce a bias of said projecting means from said housing to clamp the related joint element to its defined seat.

2. A joint support structure as in claim 1 wherein a shaft-like element projects through said housing means, said shaft-like element having one end thereof anchored with reference to said housing means and means in connection therewith selectively operable to move said one axially movable wall portion of said housing in a sense inwardly of said chamber to operate said motion transmitting means and to cause said portion thereof which turns about an axis to move laterally and outward of said shaft-like element and correspondingly produce a resultant movement of said projecting means in a sense outwardly of said housing to fix the related joint element to its seat, the construction and arrangement providing that a further selective operation of said means in connection with said shaft-like element accommodates a reverse movement of said portion of said motion transmitting means which turns about an axis, providing for a release of the related joint element from said fixed relation to its seat.

3. A joint support structure as in claim 1, said motion transmitting means being free of physical connection with said projecting means.

4. A joint support structure as in claim 1 wherein a separate relatively free sliding element forming part of said motion transmitting means is interposed between said portion of said motion transmitting means which turns about an axis and said one end portion of said projecting means and means are connected with said housing to induce movement of said one wall portion towards the said opposite wall portion and to releasably fix the position thereof inwardly of said chamber to maintain a clamp of the related joint element to its seat.

5. A joint support structure as in any one of claims 1, 3 or 4 wherein said portion of said motion transmitting means which turns about an axis comprises roller means.

6. A joint support structure as in any one of claims 1, 3 or 4 wherein said portion of said motion transmitting means which turns about an axis comprises means the outer peripheral surface of which in a cross section thereof is arcuate in configuration.

7. A joint support structure comprising means forming at least one housing defining a chamber embodying one axially movable portion constituting a clamping device forming one wall portion of said chamber, said chamber containing radially movable means and means responsive to movement of said axially movable wall portion to induce or accommodate a radial shift of said radially movable means, means projecting outwardly of said housing including a rod axially movable in response to movements of said radially movable means to releasably clamp a related joint element to a defined seat, said radially movable means presenting a sloping surface at the side thereof inwardly of said housing, said means responsive to the movements of said axially movable wall portion of said housing comprising means capable of rolling in contact with said sloping surface of said radially movable means to produce a precise radial movement thereof in response to inward movements of said axially movable wall portion of said housing.

8. A joint support structure comprising means forming at least one housing defining a chamber embodying one axially movable portion constituting a clamping device forming one wall portion of said chamber, said chamber containing radially movable means and means responsive to movement of said axially movable wall portion to induce or accommodate a radial shift of said radially movable means, means projecting outwardly of said housing including a rod axially movable in response to movements of said radially movable means to selectively clamp a related joint element to a defined seat, said axially movable wall portion including a plate-like element the innermost face of which mounts to one side thereof an inwardly projected wedge means serving as a fixed backing for said means responsive to the movement of said axially movable wall portion of said housing which comprise rollable means adapted to bear on said radially movable means with increasing radial thrust as said axially movable wall portion moves in a sense inwardly of said chamber whereby to cause a direct axial movement of said rod to clamp the related joint element to its defined seat.

9. A joint support structure as in claim 8 wherein said means projecting inwardly from said plate embodied in said movable wall portion of said housing and said radially movable means present facing surfaces which taper in a sense axially of said housing to confine said rollable means therebetween, the relative movement of said facing tapered surfaces producing a radial movement of said radially movable means in correspondence with the inward movement of said axially movable wall portion of said housing.

10. A joint support structure comprising means forming at least one housing defining a chamber embodying one axially movable portion constituting a clamping device forming one wall portion of said chamber, said chamber containing radially movable means and means responsive to movement of said axially movable wall portion to induce or accommodate a radial shift of said radially movable means, means projecting outwardly of said housing including a rod axially movable in response to movements of said radially movable means to selectively clamp a related joint element to a defined seat, said means responsive to movement of said axially movable wall portion being roller means and said roller means and said radially movable means being free as said axially movable wall portion moves inwardly of said chamber to provide for a direct radial shift of said radially movable means and said rod thereby.

11. A joint support including at least one sleeve having at one end thereof a ball joint, complete with ball and joint seat, and at the other end thereof a bearing housing the axis of which is essentially perpendicular to the axis of said sleeve, one rod arranged for axial sliding movement within said sleeve between a ball joint arresting and a release position, a clamping element arrangement located in the bearing housing to engage the rod at the end thereof adjacent the bearing housing, one clamping device embodying a single tension bolt located in and coaxially of said bearing housing, said clamping device being operatively connected to a clamping plate which is slidable on the tension bolt in the direction of the axis of the bearing housing, said clamping element arrangement consisting of at least one segment within the bearing housing slidably mounted for movement in the direction of the axis of said sleeve, said segment having on the side thereof away from said rod a wedge surface adjacent to which is located an element capable of rolling which is backed by a surface opposite to said wedge surface, the arrangement providing that an axial movement of the clamping plate produces through the medium of said element capable of rolling and said one segment a direct axial displacement of said rod.

12. A joint support structure according to claim 11 characterized by said clamping element arrangement comprising two segments one of which provides said surface which backs said element capable of rolling and said segments having wedge surfaces in facing spaced relation to each other, between which wedge surfaces are located a plurality of said element capable of rolling.

13. A joint support having at least one sleeve including at one end of the sleeve a ball joint, complete with ball and joint seat, and at the other end of the sleeve a bearing housing the axis of which is essentially perpendicular to the axis of said sleeve, an axially slidable rod located in said sleeve for movement between a ball joint arresting and a ball joint release position, a clamping device including a single tension bolt located in and coaxially of the bearing housing and operatively connected to a clamping plate which is slidable on the tension bolt in the direction of the axis of the bearing housing, a support within said housing between said clamping plate and a facing surface of said housing, said support pivotally mounting L-shaped levers at directly opposite positions thereon, the pivotal connection of each said lever to said support being at one end of the lever while the other ends of said levers are arranged to rest on relatively spaced portions of said facing surface of said housing, corner portions of said levers intermediate their ends being arranged to respectively abut against the end of said rod adjacent said housing and a diametrically opposite surface provided in said housing, the movement of said clamping plate inwardly of said housing producing a corresponding response of said support and the levers thereof to move said rod to clamp the related joint element to its seat.

14. A joint support having at least one sleeve, including at one end of the sleeve a ball joint, complete with ball and joint seat, and at the other end of said sleeve a bearing housing the axis of which is essentially perpendicular to the axis of said sleeve, an axially slidable rod located in said sleeve movable between a ball joint arresting and ball joint release position, one clamping element located in said bearing housing for engagement to the end of the rod innermost with reference to said housing, one clamping device including a tension bolt located in and coaxially of the bearing housing, said clamping device being operable on a clamping plate which is slidable on the tension bolt in the direction of the axis of the bearing housing characterized by said clamping element consisting of one arched spring element having one end resting against the innermost end of the rod and the other end upon a diametrically opposite side portion of the bearing housing to provide that the arched portion of said spring element abuts the clamping plate the movement of which inwardly of said housing produces an elongation of the spring and a direct axial movement of said rod.

15. A joint support according to any one of claims 11 through 14 wherein several of said joint supports are grouped to mount on a common tension bolt to have their bases and/or their clamping plates in adjacent bearing relation.

* * * * *